US007580735B2

(12) United States Patent
Akino

(10) Patent No.: US 7,580,735 B2
(45) Date of Patent: Aug. 25, 2009

(54) CONDENSER MICROPHONE

(75) Inventor: Hiroshi Akino, Machida (JP)

(73) Assignee: Kabushiki Kaisha Audio-Technica, Machida-Shi, Tokyo (JP)

( * ) Notice: Subject to any disclaimer, the term of this patent is extended or adjusted under 35 U.S.C. 154(b) by 465 days.

(21) Appl. No.: 11/129,306

(22) Filed: May 16, 2005

(65) Prior Publication Data

US 2005/0261039 A1 Nov. 24, 2005

(30) Foreign Application Priority Data

May 18, 2004 (JP) ............................ 2004-147327

(51) Int. Cl.
*H04M 1/00* (2006.01)

(52) U.S. Cl. ................. 455/575.1; 455/137; 455/575.5; 455/149; 381/384; 381/369; 381/355; 381/620.11; 381/113

(58) Field of Classification Search .............. 455/575.1, 455/575.7, 90.3, 137, 149, 575.5; 439/95, 439/620.11, 349; 381/368, 360, 113, 111, 381/384

See application file for complete search history.

(56) References Cited

U.S. PATENT DOCUMENTS 4,170,721 A * 10/1979 Ishibashi et al. ............ 381/360
4,414,433 A * 11/1983 Horie et al. .................... 381/92
4,757,545 A * 7/1988 Rosander ..................... 381/92
5,579,397 A * 11/1996 Ikeda et al. ................. 381/113
6,091,828 A * 7/2000 Akino et al. ................ 381/355
6,130,952 A * 10/2000 Akino et al. ................ 381/368
6,304,764 B1 * 10/2001 Pan ......................... 455/569.2
6,366,678 B1 * 4/2002 Madaffari et al. ........... 381/324
6,549,632 B1 * 4/2003 Akino et al. ................ 381/174
6,643,380 B2 * 11/2003 Rodemer .................... 381/369
6,654,473 B2 * 11/2003 Collins ....................... 381/355
6,888,408 B2 * 5/2005 Furst et al. .................. 330/277
6,954,536 B2 * 10/2005 Tanaka ........................ 381/77
6,970,727 B1 * 11/2005 Klein ...................... 455/575.2
6,978,029 B1 * 12/2005 Ikeda ......................... 381/111
6,999,596 B2 * 2/2006 Hiramoto et al. ............ 381/369
7,019,540 B2 * 3/2006 Yakabe et al. ............... 324/686
7,063,546 B2 * 6/2006 Akino ................... 439/620.21
7,136,499 B2 * 11/2006 Kondo ........................ 381/361
7,292,696 B2 * 11/2007 Saeki et al. ................. 381/175
7,382,889 B2 * 6/2008 Akino ........................ 381/113
2006/0256981 A1 * 11/2006 Song et al. .................. 381/113

* cited by examiner

*Primary Examiner*—Marceau Milord
(74) *Attorney, Agent, or Firm*—Manabu Kanesaka

(57) ABSTRACT

In a condenser microphone where a microphone capsule and an output module section are connected to each other via a microphone cord, strong electromagnetic waves generated from a cellular phone or the like are positively prevented from entering the output module section through the microphone cord. The condenser microphone in which a microphone capsule 10 and an output module section 20 are connected to each other via a microphone cord 30 composed of a twin-core shield covered wire, the microphone capsule 10 including a condenser microphone unit 12 and an impedance converter 13, the output module section 20 storing, in a shield case 21, a circuit board 22 including a voice output circuit, wherein a shield covered wire 33 of the microphone cord 30 is connected to the shield case 21, and the shield covered wire 33 is also connected to a ground circuit of the circuit board 22 via a high-frequency choke coil 51.

4 Claims, 2 Drawing Sheets

CONDENSER MICROPHONE

RELATED APPLICATIONS

The present application is based on, and claims priority from, Japanese Application Number 2004-147327, filed May 18, 2004, the disclosure of which is hereby incorporated by reference herein in its entirety.

TECHNICAL FIELD

The present invention relates to a condenser microphone in which a microphone capsule and an output module section are connected to each other via a dedicated microphone cord, and more specifically, to a technique for preventing electromagnetic waves generated from cellular phones or the like from entering the output module section through the microphone cord.

BACKGROUND ART

Condenser microphones include a gooseneck microphone for conferences and a tie pin microphone attached to clothes or the like. In these microphones, a microphone capsule 10 and an output module section 20 are separated from each other and connected via a dedicated microphone cord 30 as shown in FIG. 2.

The microphone capsule 10 comprises a capsule case 11 made of, for example, aluminum. A condenser microphone unit 12 including a diaphragm and a fixed pole (not shown) and an impedance converter 13 including an FET (field-effect transistor) are housed in the capsule case 11 acting as a shield case.

The output module section 20 comprises a cylindrical shield case 21 made of a conductive material (e.g., a brass alloy). A circuit board 22 and an output connector 23 are housed in the shield case 21. A voice output component (not shown) including a transformer, a lowcut filter circuit, and an amplifier circuit is mounted on the circuit board 22. In some cases, the output module section 20 is referred to as a power module section.

Generally, a 3-pin output connector defined by EIAJ RC5236 "a latch-lock round connector for sound" is used as the output connector 23 in the condenser microphone. To be specific, the output connector 23 comprises a first pin for grounding (shielding), a second pin used as the hot side of a signal, and a third pin used as the cold side of a signal. The output connector 23 is connected to a phantom power source (not shown) via a balanced shield cable 40. Reference numerals 1, 2, and 3 of FIG. 2 denote the first pin, the second pin, and the third pin, respectively.

The microphone cord 30 is a twin-core shield covered wire which includes a power wire 31 for supplying power to the microphone capsule 10, a signal line 32 for transmitting a voice signal outputted from the impedance converter 13 to the voice output circuit of the circuit board 22, and a shield covered wire 33 for electrostatically shielding the power wire 31 and the signal line 32 and grounding the power wire 31 and the signal line 32.

The shield covered wire 33 of the microphone cord 30 is connected to the capsule case 11 on the side of the microphone capsule 10 and is connected to a ground circuit (not shown) of the shield case 21 and the circuit board 22 on the signal input side of the output module section 20. The first grounding pin of the output connector 23 is connected, on the signal output side of the output module section 20, to the ground circuit of the shield case 21 and the circuit board 22 in a manner similar to the shield covered wire 33.

Incidentally, when strong electromagnetic waves are applied to the microphone cord 30 and the balanced shield cable 40 on the side of the phantom power source, high-frequency current caused by the electromagnetic waves may enter the shield case 21, a loop current path may be formed by the high-frequency current via a stray capacitance C between the shield case 21 and the circuit board 22, and the loop current path may cause noise.

Cellular phones have rapidly become widespread in recent years. When cellular phones are used near a microphone, extremely strong electromagnetic waves are received (for example, in a range of about several cm to several tens cm, an electric field is several tens of thousands times as strong as an electric field generated by commercial radio waves). Thus, the provision of solutions to cellular phones is an urgent necessity in the field of microphones.

As a solution, Document 1 proposes a method of connecting the ground of an electronic circuit to a microphone case via a wire and directly connecting a first grounding pin to the microphone case. The electronic circuit is housed in the microphone case (shield case) and the first grounding pin is included in an output connector. When the technique of Non-patent document 1 is applied to the conventional example of FIG. 2, a circuit configuration of FIG. 3 is obtained.

[Patent Document 1] "Radio Frequency Susceptibility of Capacitor Microphones," cowritten by Jim Brown and David Josephson, Audio Engineering Society Convention Paper 5720 (page 12, FIG. 8).

According to the method of Document 1, no loop current path is formed by a stray capacitance C between an electronic circuit (circuit board 22) and a microphone case (shield case 21) and no wire is connected from the first grounding pin to the ground (grounding circuit) of the electronic circuit, that is, nothing acts as an antenna. Thus, it is possible to effectively prevent the entry of electromagnetic waves from the balanced shield cable 40 on the side of the phantom power source.

However, in the case of the method of Document 1, the first grounding pin is directly connected to the microphone case, and thus current passes through the microphone case when the phantom power source is used. Therefore, when the first grounding pin is detached from the microphone case for any reason, the microphone case has a voltage of 30 V or higher in the case of a 48-V phantom power source, and thus a person may receive an electric shock with a touch of a hand on the microphone case.

In addition, in the condenser microphone of FIG. 2 where the microphone capsule 10 and the output module section 20 are connected to each other via the microphone cord 30, even when the technique of Non-patent document 1 is applied, it is not possible to prevent electromagnetic waves entering from the microphone cord 30 to the output module section 20 as shown in FIG. 3.

SUMMARY OF THE INVENTION

Therefore, it is an object of the present invention to positively prevent strong electromagnetic waves generated from a cellular phone or the like from entering an output module section through a microphone cord in a condenser microphone where a microphone capsule and the output module section are connected to each other via the dedicated microphone cord.

In order to attain the object, the present invention provides a condenser microphone in which a microphone capsule and an output module section are connected to each other via a microphone cord composed of a twin-core shield covered wire, the microphone capsule including a condenser microphone unit and an impedance converter, the output module section storing, in a shield case, a circuit board including a voice output circuit, wherein the shield covered wire of the microphone cord is connected to the shield case and the shield covered wire is also connected to the ground circuit of the circuit board via a high-frequency choke coil.

With this configuration, the shield covered wire of the microphone cord is connected to the shield case of the output module section and connected via the high-frequency choke coil to the ground circuit of the circuit board housed in the shield case. Thus, strong electromagnetic waves applied to the microphone cord pass along the outer surface of the shield case but do not enter the circuit board. Therefore, even when a cellular phone is used near the microphone, it is possible to prevent noise caused by strong electromagnetic waves.

According to a more preferred embodiment, the shield case comprises an output connector which includes a ground pin and two signal pins and is connected to an external power source, the ground pin is connected to the shield case, and the ground pin is also connected to the ground circuit of the circuit board via a high-frequency choke coil.

With this configuration, the ground pin (first pin) of the output connector is connected to the shield case of the output module in a manner similar to the shield covered wire, and the ground pin is connected via the high-frequency choke coil to the ground circuit of the circuit board housed in the shield case. Thus, it is also possible to prevent the entry of electromagnetic waves from the cable connected to the output connector.

Further, the ground pin is DC connected to the ground circuit of the circuit board. Thus, when a phantom power source is used as an external power source, even in the event of the ground pin detached from the shield case, the voltage of the shield case does not increase and an electrical shock is unlikely to occur.

DETAILED DESCRIPTION

Figure 1:
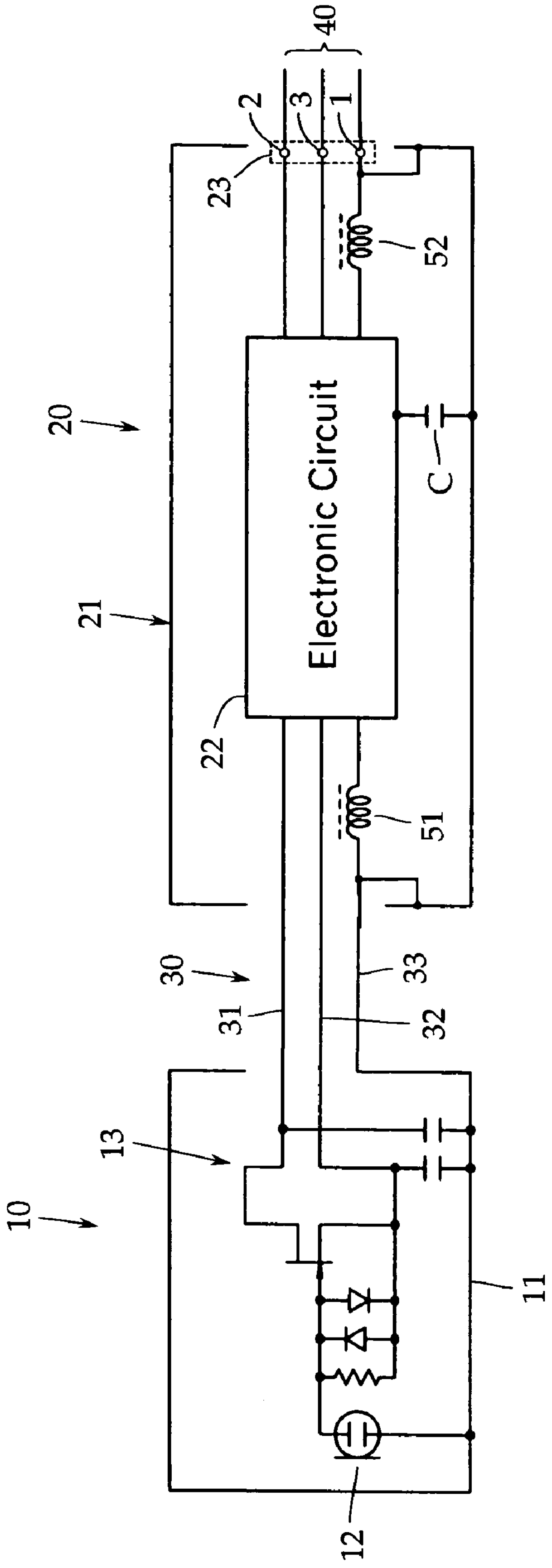
FIG. 1 is a schematic diagram showing that a microphone capsule and an output module section which are included in a condenser microphone of the present invention are connected to each other via a microphone cord.
Figure 2:
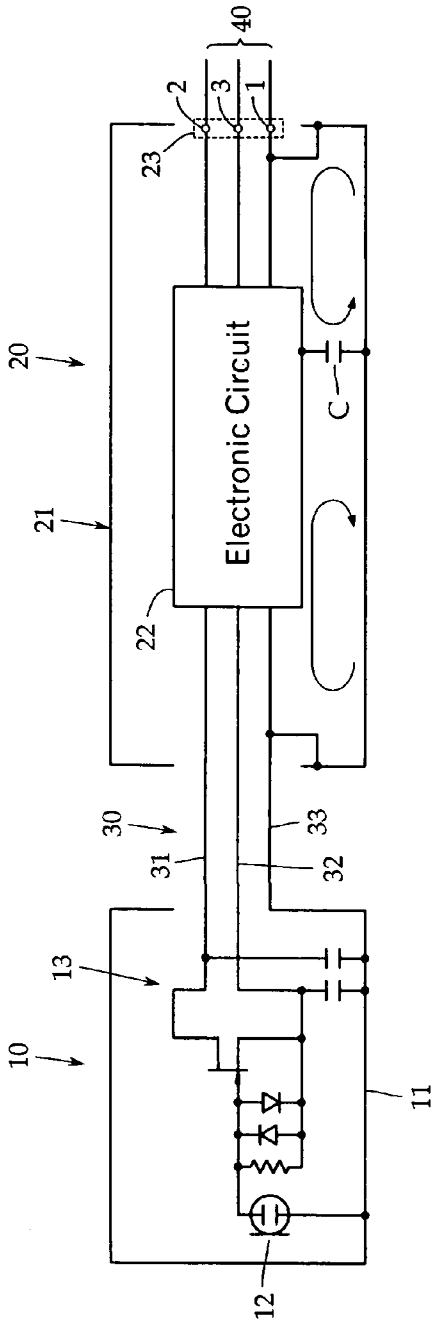
PRIOR ART FIG. 2
FIG. 2 is a schematic diagram showing a condenser microphone in which a conventional microphone capsule and output module section are connected via a microphone cord.
Figure 3:
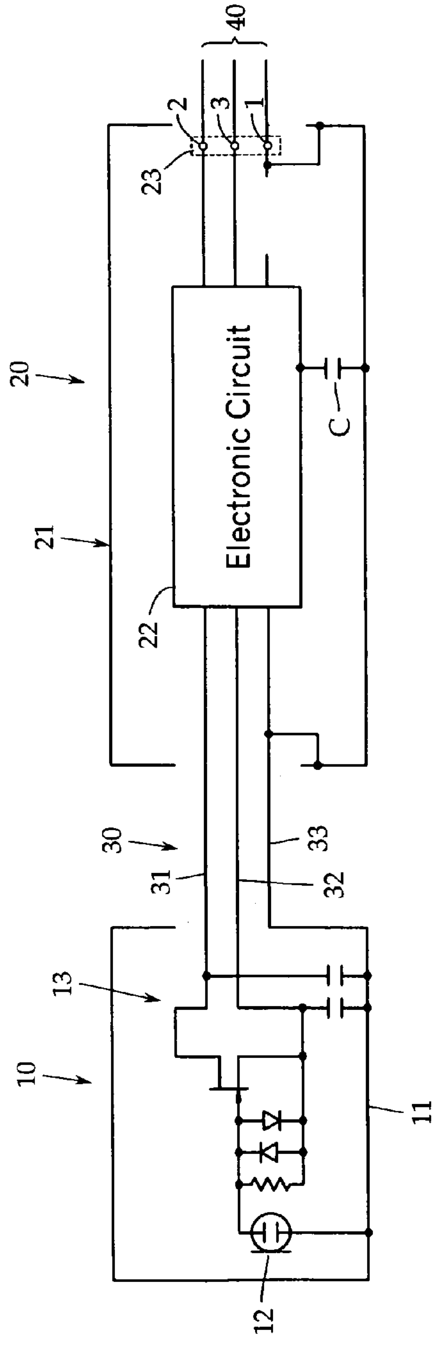
PRIOR ART FIG. 3
FIG. 3 is a schematic diagram showing an example where a technique described in Non-patent document 1 is applied to the conventional condenser microphone.

Referring to FIG. 1, an embodiment of the present invention will be described below. FIG. 1 is a schematic view showing that a microphone capsule and an output module section which are included in a condenser microphone of the present invention are connected to each other via a microphone cord. In the explanation of the embodiment, constituent elements which can be analogous to those of the conventional example shown in FIG. 2 will be indicated by the same reference numerals.

In the condenser microphone of the present invention, a microphone capsule 10 and an output module section 20 are separated from each other and connected via a microphone cord 30. Such a microphone is used as, for example, a gooseneck microphone and a tie pin microphone.

The microphone capsule 10 may be configured as follows: the microphone capsule 10 has a capsule case 11 made of, for example, an aluminum material, and the capsule case 11 includes a condenser microphone unit 12, in which a diaphragm and a fixed pole are opposed to each other, and an impedance converter 13. The condenser microphone unit 12 may be any one of electret type and non-electret type. In this way, the microphone capsule 10 can be a well-known microphone capsule in the present invention.

The output module section 20 comprises a cylindrical shield case 21 made of a conductive metal material such as a brass alloy. A circuit board 22 is housed in the shield case 21. A voice output component (not shown) including a transformer, a lowcut filter circuit, and an amplifier circuit is mounted on the circuit board 22, and a ground circuit (ground) is also formed thereon.

An output connector 23 is mounted to the shield case 21. The output connector 23 is a 3-pin output connector having a first pin "1" for grounding, a second pin "2" for the hot side of a signal, and a third pin "3" for the cold side of a signal. The output connector 23 is connected to a phantom power source (not shown) via a balanced shield cable 40.

As in the foregoing conventional example, the microphone cord 30 may be a twin-core shield covered wire which includes a power wire 31 for supplying power to the microphone capsule 10, a signal line 32 for transmitting a voice signal outputted from the impedance converter 13 to the voice output circuit of the circuit board 22, and a shield covered wire 33 for electrostatically shielding the power wire 31 and the signal line 32 and grounding the power wire 31 and the signal line 32.

The shield covered wire 33 of the microphone cord 30 will be discussed below. One end of the shield covered wire 33 is connected to the capsule case 11 of the microphone capsule 10 and the other end of the shield covered wire 33 is connected to the shield case 21 of the output module section 20. A connecting method can be freely selected.

A significant point of the present invention is that the other end of the shield covered wire 33 is connected to the ground circuit of the circuit board 22 via a high-frequency choke coil 51 serving as an inductor element. According to this configuration, for example, even when a cellular phone is used near a microphone and the strong electromagnetic waves of the cellular phone are applied to the microphone cord 30, high-frequency current caused by the electromagnetic waves is blocked by the high-frequency choke coil 51, and thus the current passes through the shield case 21 but does not pass through the ground circuit of the circuit board 22. Therefore, it is possible to prevent noise caused by electromagnetic waves.

Similarly, it is preferable that the first grounding pin included in the output connector 23 be connected to the shield case 21 of the output module section 20 and the first grounding pin be also connected to the ground circuit of the circuit board 22 via a high-frequency choke coil 52.

With this configuration, electromagnetic waves entering the ground circuit of the circuit board 22 from the balanced shield cable 40 connected to the output connector 23 are blocked by the high-frequency choke coil 52.

Additionally, the first grounding pin is DC connected to the ground circuit of the circuit board 22. Thus, when an external power source is a phantom power source, even in the event of the first grounding pin detached from the shield case 21, the voltage of the shield case 21 does not increase and an electrical shock is unlikely to occur.

The invention claimed is:

1. A condenser microphone in which a microphone capsule and an output module section are connected to each other via a microphone cord composed of a twin-core shield covered wire, the microphone capsule including a condenser microphone unit and an impedance converter, the output module section storing, in a shield case, a circuit board including a voice output circuit, wherein the shield covered wire of the microphone cord is connected to the shield case, and the shield covered wire is also connected to a ground circuit of the circuit board via a high-frequency choke coil, wherein the shield case comprises an output connector which includes a ground pin and two signal pins and is connected to an external power source, and the ground pin is connected to the shield case, and the ground circuit of the circuit board via a high-frequency choke coil.

2. A condenser microphone, comprising:

a microphone capsule including a condenser microphone unit and an impedance converter connected to the condenser microphone unit, a microphone cord formed of a power wire, a signal line and a shield covered wire, an output module section connected to the microphone capsule through the microphone cord, and including a shield case and a circuit board covered by the shield case, said circuit board having a ground circuit and a voice output circuit, a first high-frequency choke coil connected between the ground circuit and the shield covered wire to block high-frequency current from entering into the circuit board, an output connector formed at the output module section, and having a first grounding pin connected to the shield case, and a second high-frequency choke coil connected between the ground circuit and the first grounding pin, the shield case being electrically connected between the first grounding pin and the second high-frequency choke coil.

3. The condenser microphone according to claim 2, wherein the first high-frequency choke coil is connected in series between the shield covered wire and the ground circuit.

4. The condenser microphone according to claim 3, wherein the second high-frequency choke coil is connected in series between the first grounding pin and the ground circuit.

* * * * *